(No Model.) 2 Sheets—Sheet 1.
E. THOMSON.
ALTERNATING CURRENT ELECTRIC MOTOR.
No. 400,971. Patented Apr. 9, 1889.
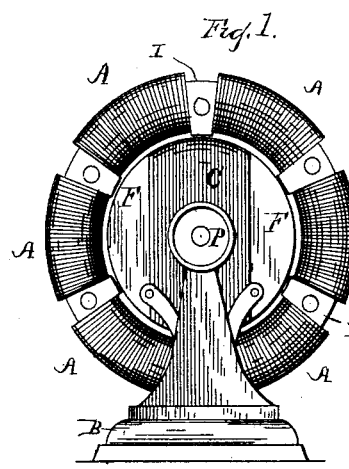
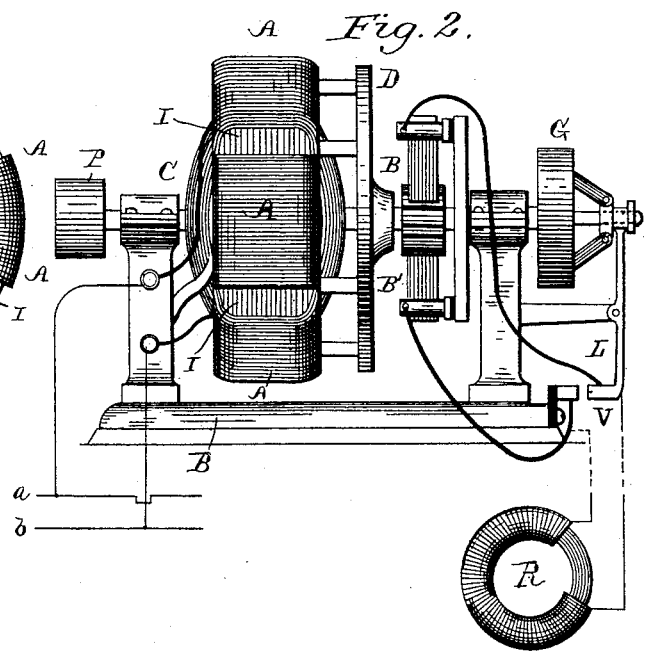
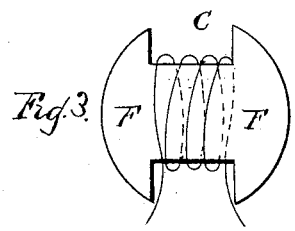
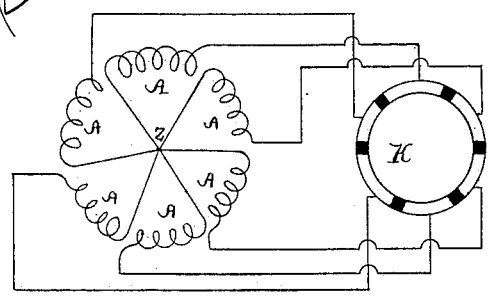
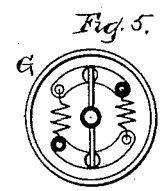
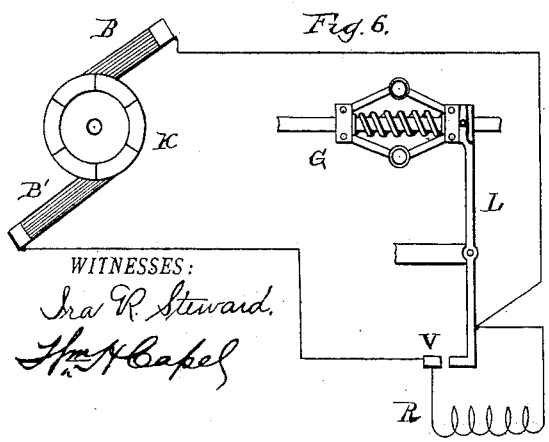
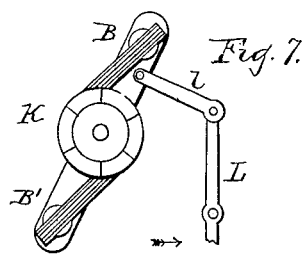
WITNESSES:
Ira R. Steward.
Wm H Capel
INVENTOR
ELIHU THOMSON.
BY
Townsend MacArthur
ATTORNEYS.

(No Model.) 2 Sheets—Sheet 2.
E. THOMSON.
ALTERNATING CURRENT ELECTRIC MOTOR.
No. 400,971. Patented Apr. 9, 1889.
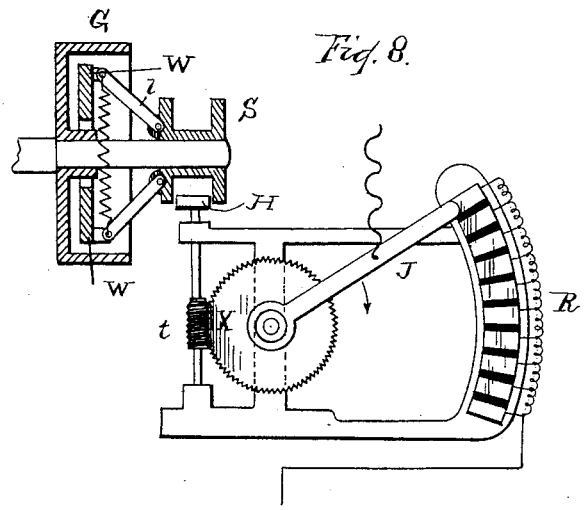
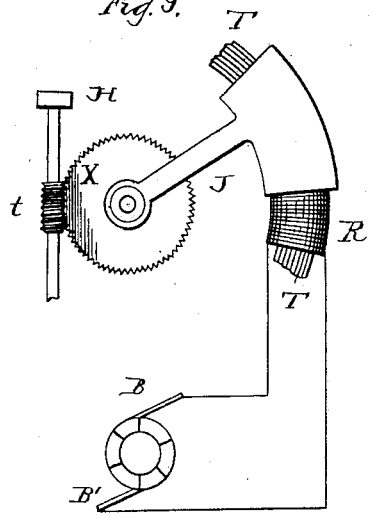
WITNESSES:
Ira R. Steward.
Wm N. Capel
INVENTOR,
ELIHU THOMSON
BY
Townsend MacArthur
ATTORNEYS.

UNITED STATES PATENT OFFICE.

ELIHU THOMSON, OF LYNN, MASSACHUSETTS.

ALTERNATING-CURRENT ELECTRIC MOTOR.

SPECIFICATION forming part of Letters Patent No. 400,971, dated April 9, 1889.

Application filed July 30, 1888. Serial No. 281,433. (No model.)

*To all whom it may concern:*

Be it known that I, ELIHU THOMSON, a citizen of the United States, and a resident of Lynn, in the county of Essex and State of Massachusetts, have invented a certain new and useful Alternating-Current Electric Motor, of which the following is a specification.

My invention relates generally to those forms of electric motors operating by alternating electric currents in which a closed-circuit armature and alternating field or field magnet or magnets are employed, the reaction between such field and the currents inductively produced thereby in the closed-circuits of the armature serving as the motive force which produces rotation of the machine. An example of a motor operating on this general principle may be found described in my prior patent, No. 363,185, May 7, 1887.

My present invention consists in the peculiar construction, hereinafter described and claimed, of a motor in which the reaction between an alternating-current field and the currents electric or magnetic induced thereby in a closed-circuit armature are employed to impart movement to either or both elements of the apparatus.

By the construction hereinafter described I obtain a cheap, simple, and efficient electric motor of the class specified.

My invention relates, further, to the means of regulating the motor; and it consists, generally, in varying the resistance to the currents induced in the closed circuit of the machine between any desired limits. In the present instance I have shown a circuit-breaker in the circuit which without the addition of resistance-coils in a shunt around it would vary the resistance from normal to infinity.

In the accompanying drawings, Figure 1 is an end elevation of a motor constructed in accordance with my invention. Fig. 2 is a side elevation of the same. Fig. 3 illustrates a detail of construction. Fig. 4 is a diagram of the circuits of the closed-circuit armature employed. Fig. 5 is an end elevation of the centrifugal governor utilized in regulating the speed of the motor. Fig. 6 is a diagram illustrating the circuits employed in regulating the speed. Fig. 7 illustrates another arrangement for governing the speed of the motor. Figs. 8 and 9 illustrate modifications of the governor.

In Fig. 1, B indicates a base-plate with journals of any suitable construction mounted thereon for supporting the shaft of the motor.

P indicates the pulley attached to the motor itself.

F F indicate a laminated iron core fixed in position by attachment to one of the standards, or by other means, and having an opening through it to form a free passage for the motor-shaft. The part F may be regarded in the present instance as the alternating field, since it is wound with a coil, C, as indicated in Fig. 3, which coil is put in circuit with the source of alternating currents—such, for instance, as wires $a\ b$—when the motor is to be driven. The field F is similar in form to the armature of the original form of Siemens dynamo-machine, and is built up of a series of plates each of the shape shown in Fig. 3, said plates being secured together by any suitable means, as now well understood in the art of construction of dynamos and motors, and being separated from one another, if desired, by thin layers of insulating material.

Supported upon a disk, D, fixed to the shaft of the machine, is a ring, I, of magnetic material, having disposed upon it a number of coils, A, of insulated wire, as shown. The ring I is made also of sheets of iron secured together with paper or other insulation between them, so as to form a laminated structure. Any number of coils A may be employed, as desired. In the present instance six are shown. The ring or core I is preferably secured to the disk D by rods of non-magnetic material extending from the face of the disk. The coils A are the closed-circuit coils or conductors of the machine.

By means of a commutator, K, suitably applied and connected, the circuit of each pair of coils A A in the same diametrical plane is closed as the plane of said coils comes into parallel position with the coil C. The closure of the circuit of such coil is maintained by the commutator K until, or until a little after, they reach positions where their planes are at right angles with that of the coil C. Any desired construction of commutator may be used for this purpose. A simple form and a simple connection for the coils A is indicated diagrammatically in Fig. 4. The commutator is made with six segments, which are connected consecutively to the terminals of the successive coils A A, while the other or remaining terminals of such coils are connected together, as at Z.

If the brushes of the commutator be set properly with relation to the segments, as can be readily done by the usual means of adjustment, and such brushes B B' be electrically connected with one another to form a closed connection for the coils, the motor will immediately start into rotation if it be supplied with alternating currents fed to the coil C and will increase its speed up to high limits. If it be desired to limit the speed, the closed-circuit connection for the closed-circuit element of the motor may have its resistance varied by any desired means—as, for instance, by a switch indicated at V, which will open such closed circuit.

In the arrangement shown in Fig. 2 the opening of the closed circuit at V simply substitutes a reactive coil, R, which, through its reactive or kicking effect in opposition to the alternating currents in the closed circuit, opposes the flow of the same and diminishes the speed of the motor. The reactive coil R also serves to diminish spark at the contacts V. The coil R may be of any suitable capacity, as desired. It might even be so large that the same practical effects could be obtained by omitting such coil and allowing the contact V to entirely open the closed circuit. The coil R is, however, useful in preventing damage by sparking at the contact V. The contact V may be operated by a lever, L, connected with a centrifugal speed-governor, G, of any desired description, which, when the speed rises to a predetermined amount, will move the lever L sufficiently to open the contact.

In the operation of the motor under the effect of alternating currents in C, currents are induced into the closed-circuit coils A when in parallel position with the coils C, and such currents delivered at the commutator to the brushes B B' are permitted to circulate through the circuit from one brush to the other. Under the reaction set up between the coils C and the coils A the latter at once move so as to bring their plane out of parallelism with the plane of coils C and tend to rotate to occupy the plane lying in a horizontal diameter transverse to the plane of coils C. The action results in continuous rotation.

A form of governor, G, suitable for operating on the lever L is indicated in Fig. 5. The reactive coil R, operating to oppose the flow of the alternating current, might be simply an artificial resistance without sensible reaction. When so modified, it would still operate to prevent injurious sparking at the contacts V. Instead of regulating the operation of the machine by varying the resistance in the closed circuit, I may shift the commutator-brushes B B' to produce the same effect. This might be done by suitable link-connections from the lever L, as indicated in Fig. 7. The operation would be simply to move the brushes to positions where the coils A A would operate less effectively.

In Fig. 8 a more elaborate governing mechanism is shown. In this case the governor G, of any suitable construction, has weights W, which, as they spread under centrifugal force, move a double flange clutch or sleeve, S, so as to bring one or the other of the flanges or clutch-surfaces into contact with a friction-roll, H. The latter imparts movement to a screw, T, and worm-wheel X, which in turn moves a switch-lever, J, over the contacts of a variable resistance, R, interposed in the closed circuit of the machine. On an increase of speed the roll H will be revolved in one way by contact with the outer flange, and on a decrease of speed will be moved in the opposite direction by the inner flange. By properly organizing the apparatus the resistance may be increased when the speed rises and decreased when the speed falls. A slight play of the sleeve S being allowed without connection of the same with the roll H, it is obvious that the adjustment will be maintained so long as the speed remains constant.

Another means of varying the resistance in the closed circuit is indicated in Fig. 9. This device consists of a reactive or kicking coil, R, the reaction of which is varied by means of a sheath of good conducting material carried by the arm J and moved so as to include a greater or less amount of the coil R. When the sheath is moved over the coil, the reaction diminishes and will finally almost disappear, owing to the presence of the secondary path thus provided by the sheath for currents induced from coil R. Under this condition current may flow more freely on the closed circuit of the machine, and the speed of the motor will rise.

While I have described one element of the machine only as moving, it is obvious that by suitable mounting the parts of both elements might be made to revolve, or that the closed-circuit element might be stationary and the alternating-current-inducing element be made to revolve.

The special device of the induced-current sheath operating with the reactive coil R after the manner shown in Fig. 9 forms the subject of claims in another application for patent filed by me.

What I claim as my invention is—

1. In an alternating-current electric motor in which the reaction between an alternating field and currents induced by such field in a closed-circuit armature is employed as the motive force, a ring or endless structure of iron, I, carrying coils A, operated on closed local circuit.

2. In an alternating-current electric motor having an alternating field and a closed-circuit conductor, the reaction between which and the field produces motive effects, an external ring, I, carrying coils A on locally-closed circuit, and an internal electro-magnet, F, carrying coils C, connected to an alternating source, as and for the purpose described.

3. In an alternating-current electric motor, an alternating-current field-coil, C, fixed in position, as described, and wound over a suitable core, F, and a revoluble ring-magnet, I, carrying the coils which form the circuit for the induced currents by whose reaction the ring is revolved.

4. In an alternating-current electric motor having a closed electric circuit for induced currents, by the reaction of which on an inducing alternating field the motor is operated, a laminated external ring-magnet, in combination with a laminated internal magnet formed, as shown and described, with a central reduced portion for the coils and enlarged polar portions conforming to the circular internal line of the outer ring-magnet, both said magnets being wound with suitable coils, one set of which is closed on itself.

5. In an alternating-current electric motor having a closed armature-circuit, as described, forming the path of induced currents by whose reaction motion is produced, means for varying the resistance to such induced currents for the purpose of regulating the speed or power of the motor.

6. In an alternating-current electric motor, the combination, with the closed circuit for the induced currents, of means for varying the resistance to the induced currents and a speed-governor for adjusting the devices which vary the resistance.

7. The combination, substantially as described, of the speed-governor, a double flange disk or clutch, S, connected therewith, a roll, H, and a screw and worm wheel, T X, the worm-wheel X carrying an arm, J, which supports the device for producing variations in the resistance to the alternating currents.

8. The combination, substantially as described, of the circular-shaped core I, carrying coils A, an internal inducing alternating field-magnet, F C, and a commutator, K, for closing the circuit of coils A in the same plane, when, by reason of rotation of the shaft with the motor, such plane is parallel with the plane of the coils C.

Signed at Lynn, in the county of Essex and State of Massachusetts, this 26th day of July, A. D. 1888.

ELIHU THOMSON.

Witnesses:
   J. W. GIBBONEY,
   A. L. ROHRER.